United States Patent
Sibert

(10) Patent No.: US 6,851,087 B1
(45) Date of Patent: Feb. 1, 2005

(54) SYSTEM AND METHOD OF PROCESSING COMPUTER FORM DATA

(75) Inventor: Mark A. Sibert, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 706 days.

(21) Appl. No.: 09/679,128

(22) Filed: Oct. 4, 2000

(51) Int. Cl.[7] .............................................. G06F 17/24
(52) U.S. Cl. ...................................... 715/505; 715/513
(58) Field of Search ................................. 715/505, 507, 715/513; 707/10

(56) References Cited

U.S. PATENT DOCUMENTS

| | | | | |
|---|---|---|---|---|
| 5,745,360 A | | 4/1998 | Leone et al. ................. | 364/140 |
| 5,884,309 A | * | 3/1999 | Vanechanos, Jr. ............ | 707/10 |
| 5,898,838 A | | 4/1999 | Wagner .................. | 395/200.54 |
| 5,940,075 A | | 8/1999 | Mutschler, III et al. .... | 345/335 |
| 5,953,731 A | | 9/1999 | Glaser ......................... | 707/513 |
| 5,973,696 A | | 10/1999 | Agranat et al. ............. | 345/357 |
| 6,199,079 B1 | * | 3/2001 | Gupta et al. ................ | 715/507 |
| 6,202,072 B1 | * | 3/2001 | Kuwahara .................... | 715/513 |
| 6,457,009 B1 | * | 9/2002 | Bollay ......................... | 707/10 |

OTHER PUBLICATIONS

Eastlake, D. and Goldstein, T., RFC 2706—ECML v1: Field Names for E–Commerce, Oct. 1999, www.w3c.org.*
Research Disclosure p. 1011–1012 Abstract No. 42311 (Jul. 1999).

* cited by examiner

Primary Examiner—Stephen S. Hong
Assistant Examiner—Doug Hutton
(74) Attorney, Agent, or Firm—Synnestvedt & Lechner LLP; Gregory M. Doudnikoff

(57) ABSTRACT

A technique of translating the data structure of a data group pertaining to a computer form from a first format to a second format, is disclosed. A method implementing this technique includes the steps of correlating data fields of the first format with data fields of the second format, identifying data fields from the data group corresponding to the first format, and replacing field identifiers of the identified data fields with field identifiers of the data fields of the second format based on the results of the correlating step. The technique allows a system to easily correlate unrecognizable field names, such as those used in ECML format, with recognizable field names, such as merchant-specific proprietary names, and to process data associated with the unrecognizable field names without having to extensively modify the entire system.

19 Claims, 9 Drawing Sheets

```
<HTML>
   <CENTER>
P1 ->  <FORM method=POST action="/cgi-bin/ncommerce3/NewOrder">

<p align=left><font size=5><strong>New Order</strong></font></p>

<TABLE WIDTH=80%>
          <TR><TD VALIGN=MIDDLE><FONT SIZE=+2><B>Ordering Information</B></FONT></TD></TR>

<TR><TD>
          <TABLE CELLSPACING=10>
             <TR><TD><FONT SIZE=-1>Title</FONT></TD><TD><A NAME="satitle">
             <SELECT NAME="satitle">
P2 -         <OPTION SELECTED VALUE="Mr">Mr
             <OPTION    VALUE="Mrs">Mrs
             <OPTION    VALUE="Ms">Ms
             <OPTION    VALUE="Dr">Dr
             </SELECT></TD><TD><B><FONT SIZE=-1>Last Name</FONT></B></TD><TD>
             <A NAME="proprietary_lname">
P3           <INPUT TYPE="text" NAME="proprietary_lname"
                    VALUE="" SIZE="20" MAXLENGTH="30">
             </TD></TR>

P4           <TR><TD><FONT SIZE=-1>First Name</FONT></TD><TD><A NAME="proprietary_fname">
             <INPUT TYPE="text" NAME="proprietary_fname"
                    VALUE="" SIZE="20" MAXLENGTH="30">
             </TD><TD><FONT SIZE=-1>Middle Name</FONT></TD><TD><A NAME="proprietary_mname">
P5           <INPUT TYPE="text" NAME="proprietary_mname"
                    VALUE="" SIZE="20" MAXLENGTH="30">
             </TD></TR>

P6           <TR><TD><FONT SIZE=-1>Part Number to Order</FONT></TD><TD><A
                NAME="proprietary_pnumber">
             <INPUT TYPE="text" NAME="proprietary_pnumber" VALUE="" SIZE="20" MAXLENGTH="30">
             </TD></TR>
          </TABLE>
          </TD></TR>

<TR><TD WIDTH=460 VALIGN=LEFT><FONT SIZE=5><B>
          Submit Your Order</B></FONT></TD></TR>

P7        <TR><TD><VALIGN=MIDDLE><FONT SIZE=+2>
          You are now ready to submit your order for approval. To submit your
          order, click the Submit Order button.
          <TABLE CELLPADDING=10>
             <TR><TD><INPUT TYPE="submit" VALUE="Submit Order"></TD></TR>
          </TABLE>
          </TD></TR>
       </TABLE>
   </FORM>
   </CENTER>
</HTML>
```

Fig. 4
Prior Art

| GENERAL DESCRIPTOR | FIELD NAME |
|---|---|
| ship to title | Ecom_ShipTo_Postal_Name_Prefix |
| ship to first name | Ecom_ShipTo_Postal_Name_First |
| ship to middle name | Ecom_ShipTo_Postal_Name_Middle |
| ship to last name | Ecom_ShipTo_Postal_Name_Last |
| ship to name suffix | Ecom_ShipTo_Postal_Name_Suffix |

Fig. 6

```
<HTML>
  <CENTER>
P10 --><FORM method=POST action="/servlet/com.ibm.PaymentSuite.ConvertFields.ConvertFields">
      <INPUT TYPE="HIDDEN" NAME="_MAP__FORM_ACTION"
          VALUE="https://wassup.raleigh.ibm.com/cgi-bin/ncommerce3/NewOrder">
      <INPUT TYPE="HIDDEN" NAME="_MAP__FORM_METHOD"
          VALUE="POST">
      <INPUT TYPE="HIDDEN" NAME="_MAP__Standard_Name_Last"
P15 -     VALUE="proprietary_lname">
      <INPUT TYPE="HIDDEN" NAME="_MAP__Standard_Name_First"
          VALUE="proprietary_fname">
      <INPUT TYPE="HIDDEN" NAME="_MAP__Standard_Name_Middle"
          VALUE="proprietary_mname">

<p align=center><font size=5><strong>New Order</strong></font></p>

<TABLE WIDTH=80%>
        <TR><TD VALIGN=MIDDLE><FONT SIZE=+2><B>Ordering Information</B></FONT></TD></TR>

<TR><TD>
        <TABLE  CELLSPACING=10>
          <TR><TD><FONT SIZE=-1>Title</FONT></TD><TD><A NAME="satitle">
          <SELECT NAME="satitle">
P2          <OPTION SELECTED VALUE="Mr">Mr
            <OPTION   VALUE="Mrs">Mrs
            <OPTION   VALUE="Ms">Ms
            <OPTION   VALUE="Dr">Dr
          </SELECT></TD><TD><B><FONT SIZE=-1>Last Name</FONT></B></TD><TD>
          <A NAME="proprietary_lname">
P30         <INPUT TYPE="text" NAME="Standard_Name_Last"
                VALUE="" SIZE="20" MAXLENGTH="30">
          </TD></TR>

<TR><TD><FONT SIZE=-1>First Name</FONT></TD><TD><A NAME="proprietary_fname">
P40         <INPUT TYPE="text" NAME="Standard_Name_First"
                VALUE="" SIZE="20" MAXLENGTH="30">
          </TD><TD><FONT SIZE=-1>Middle Name</FONT></TD><TD><A NAME="proprietary_mname">
P50         <INPUT TYPE="text" NAME="Standard_Name_Middle"
                VALUE="" SIZE="20" MAXLENGTH="30">
          </TD></TR>

<TR><TD><FONT SIZE=-1>Part Number to Order</FONT></TD><TD><A
P6          NAME="proprietary_pnumber">
            <INPUT TYPE="text" NAME="proprietary_pnumber" VALUE="" SIZE="20" MAXLENGTH="30">
          </TD></TR>
        </TABLE>
        </TD></TR>

<TR><TD WIDTH=460 VALIGN=LEFT><FONT SIZE=5><B>
        Submit Your Order</B></FONT></TD></TR>

P7      <TR><TD><VALIGN=MIDDLE><FONT SIZE=+2>
        You are now ready to submit your order for approval.  To submit your
        order, click the Submit Order button.
        <TABLE CELLPADDING=10>
          <TR><TD><INPUT TYPE="submit" VALUE="Submit Order"></TD></TR>
        </TABLE>
        </TD></TR>
      </TABLE>
    </FORM>
  </CENTER>
</HTML>
```

Fig. 7

10 ← POST /servlet/com.ibm.PaymentSuite.ConvertFields.ConvertFields HTTP/1.0
   Accept: image/gif, image/jpeg, image/pjpeg, */*
   Referer: http://wassup.raleigh.ibm.com/OrderSummary.html
   Accept-Language: en-us
   Content-Type: application/x-www-form-urlencoded
   Accept-Encoding: gzip, deflate
   User-Agent: Mozilla/4.0 (compatible; MSIE 5.0; Windows NT; DigExt)
   Host: wassup.Raleigh.ibm.com
   Content-Length: 362
   Connection: Keep-Alive 20
   _MAP_FORM_ACTION=https://wassup.raleigh.ibm.com/cgi-bin/ncommerce3/NewOrder&_MAP__FORM_
   METHOD=POST&_MAP__Standard_Name_Last=proprietary_lname&_MAP__Standard_Name_First=pro
   prietary_fname&_MAP__Standard_Name_Middle=proprietary_mname&satitle=Mr.&Standard_Name_Las
   t=Sibert&Standard_Name_First=Mark&Standard_Name_Middle=Alan&proprietary_pnumber=2343&SUB
   MIT=Submit+Order

FIG. 9A
HTTP Post Data From User's Browser

| Field Name | Field Value |
|---|---|
| ⋮ | ⋮ |
| _MAP_FORM_ACTION | https://wassup.raleigh.ibm.com/cgi-bin/ncommerce3/RegisterNew |
| _MAP_FORM_METHOD | POST |
| _MAP_Standard_Name_Last | Proprietary_lname |
| _MAP_Standard_Name_First | Proprietary_fname |
| _MAP_Standard_Name_Middle | Proprietary_mname |
| Satitle | Mr. |
| Standard_Name_Last | Sibert |
| Standard_Name_First | Mark |
| Standard_Name_Middle | Allan |
| ⋮ | ⋮ |

FIG. 9C
New or Modified HTTP Post Data

| | |
|---|---|
| ⋮ | ⋮ |
| satitle | Mr. |
| Proprietary_lname | Sibert |
| Proprietary_fname | Mark |
| Proprietary_mname | Allan |
| ⋮ | ⋮ |

FIG. 9B
Hashtable

| | Key Name | Key Value |
|---|---|---|
| | ⋮ | ⋮ |
| KP1 | _MAP_FORM_ACTION | https://wassup.raleigh.ibm.com/cgi-bin/ncommerce3/RegisterNew |
| KP2 | _MAP_FORM_METHOD | POST |
| KP3 | _MAP_Standard_Name_Last | Proprietary_lname |
| KP4 | _MAP_Standard_Name_First | Proprietary_fname |
| KP5 | _MAP_Standard_Name_Middle | Proprietary_mname |
| KP6 | Satitle | Mr. |
| KP7 | Standard_Name_Last | Sibert |
| KP8 | Standard_Name_First | Mark |
| KP9 | Standard_Name_Middle | Allan |
| | ⋮ | ⋮ |

SYSTEM AND METHOD OF PROCESSING COMPUTER FORM DATA

BACKGROUND OF THE INVENTION

1. Field of the Invention

The present invention relates to a technique for processing computer form data and, more particularly, to a system and method of processing computer form data by dynamically converting data field names of a computer form such as an HTML form, into recognizable data field names using mapping information.

2. Description of the Related Art

As the largest network of computers in the world, the Internet is revolutionizing the business environment. Through the Internet, merchants can offer their products and services to anyone who accesses their Web pages. As a result, online shopping has become extremely popular and merchants are eagerly seeking ways to improve the online shopping experience of the users.

FIG. 1 illustrates a typical e-commerce arrangement in which a potential purchaser, referred to generically herein as a "user", and a merchant transact business. As shown in FIG. 1, a user's computer 10 is connectable to the Internet 30 through a known device such as a modem. A merchant's server 20 is also connectable to the Internet 30, thereby establishing a communication connection between the user and the merchant.

A Web browser 12 is stored on the user's computer 10. A Web browser is a client program which displays and allows interaction with Web pages that are typically written in the well known HyperText Markup Language (Ht). The merchant's server 20 includes a HyperText Transport Protocol (HTTP) server 22 for managing communications to and from the user's browser 12, and a form processing program (FPP) 24 for processing form data received by the HTTP server 22 from the browser 12.

FPP's are well known and typically comprise computer software that processes form data input to the FPP. In older systems, many of which are still in operation today, the FPP 24 is programmed to recognize only merchant-specific (also called "proprietary") form data.

In online shopping, a merchant typically posts its product and/or service information on Web pages stored on its server 20. In a well known manner, these Web pages can be downloaded by a user and displayed on the user's computer 10 under control of the Web browser 12. A typical Web page can include embedded images, video or audio segments, and references to one or more other Web pages, all of which may be used to display product information to the user in an attempt to elicit a sale.

When the user is ready to make an online purchase, the user transmits an order form request to the HTTP server 22 of the merchant's server 20, which in turn transmits an HTML file containing information for displaying an order form to the user's browser 12. The browser 12 then displays the order form on the screen of the users's PC 10 according to the contents of the HTML file.

Typically, an order form includes data fields for soliciting relevant data pertaining to the user and/or the potential purchase, such as the user's personal information (e.g., name, address, phone number, etc.), financial information (e.g., credit card number, expiration date, etc.), product information, shipping information, and any other information needed to complete the online purchase. A very simple example of such a form as it would appear on a user's computer screen is shown in FIG. 2. The order form of FIG. 2 includes a "Title" field 202, a "Last name" field 204, a "First name" field 206, a "Middle name" field 208, and a "Part number to order" field 210. The user fills in the requested information and transmits the form back to the merchant's server 20 where it is processed by the FPP 24.

FIG. 3 illustrates an example of an HTML form file (referred to herein as an "HTML form") which generates the order form of FIG. 2. As can be seen in FIG. 3, the HTML form file, like all HTML files, comprises a series of coded commands which, in a well known manner, specifies the layout, text, and operations of the displayed Web page. Some of the coded commands in the HTML form illustrated in FIG. 3 are executory in nature, i.e., they are instructions which will direct a processor to take certain actions. For example, part P1 of the HTML file identifies a location ("cgi-bin/ncommerce3/NewOrder") on the merchant's server 20 to which the user's data will be submitted. Other coded commands are directed to the actual display on the user's computer screen. For example, part P2 displays different name titles (e.g., "Mr." or "Ms.") from which the user can select.

Part P3 displays an input area for the user's last name (i.e., the "Last name" field 204 of FIG. 2), where the field name is "proprietary_lname". Likewise, part P4 displays an input area for the user's first name (field name="proprietary fname"); part P5 displays an input area for the user's middle name (field name="proprietary_mname"); and part P6 displays an input area for the part number to be ordered by the user (field name="proprietary_pnumber"). Part 7 displays a "Submit Order" button on the form page so that the user can submit the input data by clicking on this button.

Once the user inputs all the required data into the data fields of the HTML form and clicks the "Submit Order" button, the browser 12 prepares, in a well known manner, an HTTP Post based on the user's input data. The HTTP Post is essentially a "stripped" version of the now-completed HTML form, i.e., the HTTP Post contains the field name(s) and the user input associated with the field name(s), but without the information which specifies the graphical layout of the displayed HTML form. The browser 12 transmits the prepared HTTP Post to the merchant's HTTP server 22 over the Internet 30 for processing.

When the merchant's HTTP server 22 receives the HTTP Post from the user's browser 12, the HTTP server 22 routes the HTTP Post to the FPP 24. Since the FPP 24 has been previously configured to recognize and process the merchant's proprietary names as the field names for the HTTP Post data, the FPP 24 is able to correctly process the HTTP Post data and utilize the input user data.

Since the system illustrated in FIGS. 1–3 uses unique proprietary field names, the system of one merchant cannot process data associated with the proprietary field names of another merchant. This creates a major problem in the e-commerce industry because exchange of data between two or more merchants cannot be performed without having to extensively modify their existing systems. This problem also causes an extreme inconvenience to Internet users because the users have to input the same information (e.g., name, address, etc.) each time they conduct business with a new merchant. This deters many Internet users from shopping online or conducting other online transactions.

Recently, a group of companies, including IBM, American Express, Compaq, Visa, MasterCard, and others, have collaborated to standardize the use of field names on merchant Web sites. The format is called Electronic Commerce Modeling Language (ECML) and employs a set of uniform field names which are included in the HTML code on online order forms. FIG. 4 illustrates a listing of several ECML field names and corresponding general descriptors identifying the data field to which they pertain. In ECML application, a consumer has to input the data just once and this data is stored in a "digital wallet," typically on the user's PC. The digital wallet is accessed to provide the stored data to each merchant Web page whenever such data is requested. The user's server automatically "fills out" the order form and transmits it to the merchant's server as discussed above. Such a mechanism is convenient to the user since the user has to input the user's data just once, thereby enhancing the user's online shopping experience.

A problem arises, however, when a merchant using an existing or "non-standardized" system wants to transact business with a user utilizing a digital wallet or similar standardized format. Using the proprietary field names to refer to the data fields (e.g., using "proprietary_lname" to refer to the "last name" field) may serve the needs of the merchant when the user directly inputs the requested data to the merchant's form. But when the user data is input via, for example, a digital wallet containing standardized ECML fields, the digital wallet refers to the data fields using the ECML field names (e.g., using "Ecom_ShipTo_Postal_Name_Last" as the "ship to last name" field) and the merchant's system will not recognize the ECML field names. As a result, errors will occur and the merchant may lose potential sales and customers.

One way to address this problem would be for the merchant to examine its system in detail and to replace the proprietary field names, wherever they are used in the system, with the standardized (e.g., ECML) field names. This process can be time-consuming, highly expensive, and complicated, and is prone to error and malfunctions since each use of the proprietary field names must be re-keyed with the standardized field names throughout the entire system. On the other hand, if the merchant fails to replace it's proprietary field names with the standardized field names, the merchant's system will not be able to process the user's data associated with the standardized field names since the merchant's system will not recognize the standardized field names. The merchant may lose potential customers and sales and may ultimately lose his or her competitive edge to compete in the field of e-commerce.

Accordingly, an extremely urgent need exists for a simplified technique to be developed wherein a merchant can process user's data associated with the non-proprietary field names (e.g., ECML field names or any standardized field names) without having to change the proprietary field names throughout their system. Such a technique will enhance the online experience of Internet users and will further facilitate the exchange of information do and data among e-commerce businesses.

SUMMARY OF THE INVENTION

The present invention provides a novel technique for enabling a merchant's Web site to process new or standardized field names or field name changes without the need to completely revise the programs and content on the merchant's Web server. The present invention includes the embedding of specific mapping instructions in a Web page, typically a form to be completed by a user, and an interface between the merchant's server and a computer form processing program of the merchant's system. The interface can reside in or be connected to the merchant's server and is pre-configured to be able to correlate the new or standardized field names with the proprietary field names used by the merchant.

When a user submits a request for a computer form (e.g., online purchase order form) to the merchant's server, the merchant's server transmits a computer form embedded with mapping information which includes mapping instructions to direct the merchant's server to map the standardized field name to the proprietary field name. Once the user receives the computer form, the user fills it out and transmits the form data with the mapping information to the merchant's server. When the merchant's server receives the transmitted information containing the new fields of the computer form, it routes the information to the interface. The interface replaces the new field names with the appropriate, recognizable, merchant-specific field names using the mapping information, and then sends the modified information to the form processing program. The form processing program is then able to process the data fields contained in the modified information because they employ the recognizable merchant-specific field names, instead of the unrecognizable new field names. Thus, once the merchant sets up the interface and modifies the order form to include the embedded mapping information, a link is established between the new fields and the merchant-specific fields. Further, as additional field standards are developed and/or as the existing field standards are modified, the merchant can modify the interface and order form to accommodate the newly developed field names without having to change the entire operation of the existing system.

More specifically, the present invention is directed to a system and method of dynamically converting first field names of a computer form which may be, but is not limited to, an HTML form, into second field names. The first field names can be new or standardized field names, e.g., the field names used in ECML. The second field names can be proprietary field names which are unique and recognized only by the provider of the proprietary field names, e.g., the merchant's system. This allows the merchant to process data associated with the standardized field names without having to change its existing system, because received standardized field names can be converted into appropriate proprietary field names which the merchant's system already recognizes.

It is therefore an object of the present invention to provide a technique whereby field names of a computer form used in an Internet-based system which are unrecognized by a form processor can be dynamically converted into recognizable field names using mapping information.

Other objects and advantages of the present invention will be set forth in part in the description and the drawings which follow, and, in part, will be obvious from the description or may be learned by practice of the invention.

To achieve the forgoing objects, and in accordance with the purpose of the invention as broadly described herein, the present invention provides a method of translating the data structure of a data group pertaining to a computer form from a first format to a second format, comprising the steps of correlating data fields of the first format with data fields of the second format; identifying data fields from the data group corresponding to the first format; and replacing field identifiers of the identified data fields with field identifiers of the data fields of the second format based on the results of the correlating step.

The present invention is further directed to computer readable code stored on media, for translating the data structure of a data group pertaining to a computer form from a first format to a second format, comprising first subprocesses for correlating data fields of the first format with data fields of the second format; second subprocesses for identifying data fields from the data group corresponding to the first format; and third subprocesses for replacing field identifiers of the identified data fields with field identifiers of the data fields of the second format based on the results of the correlation to convert the first data field into the third data field.

Furthermore, the present invention embodies a system for processing form data of a computer form, the system comprising first means for receiving the form data of the computer form through a communication network, the form data including mapping information and a plurality of first data field pairs, each of the first data field pairs including a first field name and a first field value; second means for communicating with the first means, changing at least one of the first field names based on the mapping information, and thereby generating a plurality of second data field pairs; and third means for communicating with the first means and processing the plurality of second field pairs.

Moreover, the present invention provides a method of processing form data of a computer form, the method comprising the steps of receiving the form data of the computer form through a communication network, the form data including mapping information and a plurality of first data field pairs, each of the first data field pairs including a first field name and a first field value; changing at least one of the first field names based on the mapping information and thereby generating a plurality of second data field pairs; and processing the plurality of second data field pairs.

The present invention will now be described with reference to the following drawings, in which same reference numbers denote the same element throughout.

BRIEF DESCRIPTION OF THE DRAWINGS

FIG. 2 is an example of an online purchase order form as displayed on a computer screen;

FIG. 3 is an example of an HTML file for displaying the purchase order form as shown in FIG. 2;

FIG. 4 illustrates several examples of ECML field names and their descriptions;

FIG. 6 is an example of an HTML file for displaying a computer form page used in the system of FIG. 5 in accordance with the preferred embodiment of the present invention;

FIG. 7 is an example of an HTTP Post generated by the user's browser in accordance with the preferred embodiment of the present invention;

FIG. 9A is a table for illustrating examples of field pairs (field name, field value) contained in the HTTP Post of FIG. 7;

FIG. 9B is an example of a hashtable prepared by a field name converting program (FNCP) of the system of FIG. 5; and FIG. 9C is a table for illustrating examples of field pairs contained in a modified HTTP Post generated by the FNCP of the system shown in FIG. 5.

DESCRIPTION OF THE PREFERRED EMBODIMENTS

Figure 1:
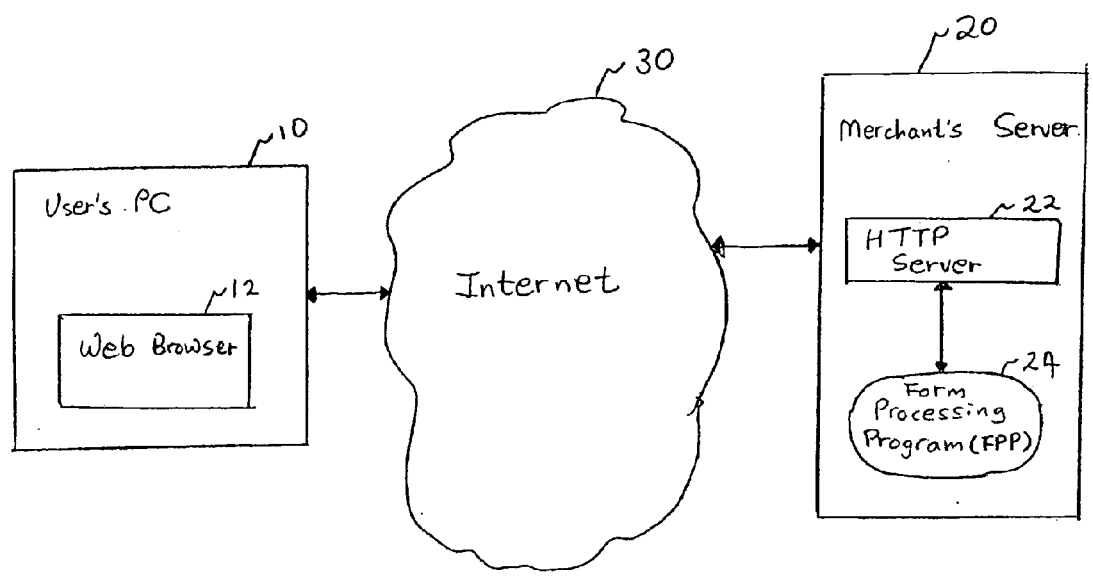
FIG. 1 is a pictorial representation of a conventional form data processing system capable of communicating with a user's browser over the Internet.

The preferred embodiment of the present invention will now be discussed with reference to FIGS. 5 through 9C. Although the present invention as explained below is for converting an HTTP Post containing new or standardized field names (first format) of a computer form into an HTTP Post containing corresponding merchant-specific or proprietary field names (second format), it should be clearly understood that the present invention is not limited to such, but is applicable to wherever compatibility between two systems using different identifiers to designate the same information, or between two different formats for carrying the same information, is desired. Furthermore, "user(s)" in the present invention can include an individual, a merchant, a service-provider, a company, an institution, or any entity. Similarly, "merchant(s)" in the present invention can include an individual, a company, an institution, a service-provider, or any entity. "Field names" represent any identifier that identifies the field. Elements with same reference numerals are identical elements.

Figure 5:
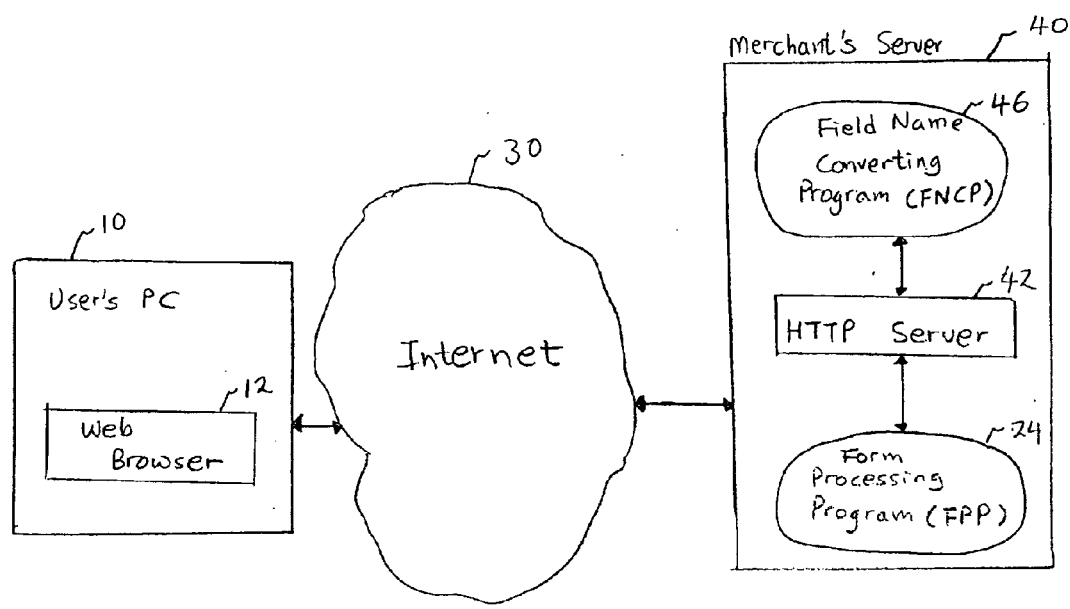
FIG. 5 is a pictorial representation of a computer form data processing system capable of communicating with a user's browser over the Internet in accordance with a preferred embodiment of the present invention.

FIG. 5 is a pictorial representation of a computer form data processing system in accordance with the preferred embodiment of the present invention. As shown in FIG. 5, the system includes an HTTP server 42, a form processing program (FPP) 24, and a field name converting program (FNCP) 46, all operatively connected as part of a merchant's server 40. The system of FIG. 5 is substantially the same as the system of FIG. 1, except for the addition of the FNCP 46 and the operation of the HTTP server 42 to accommodate the FNCP 46. The present invention presumes that the FPP 24 has been set up initially to recognize the proprietary field names of the merchant and does not recognize any newly developed field names such as the standardized field names.

As an initial set-up step, the merchant must embed hidden mapping information on a computer form page (e.g., an online purchase order form) to be displayed on the screen of the user's PC 10 when it is requested. The mapping information or "mapping fields" are predetermined and identify a list of the standardized field names and their corresponding proprietary field names as field pairs. Once the user fills out the computer form page and directs the Web browser 12 to submit the information to the merchant's server 40, the Web browser 12 creates an HTTP Post containing the standardized field names and their associated input data, as well as mapping information which the HTTP server 42 uses to direct the HTTP Post to the FNCP 46 when the server 42 receives the HTTP Post.

In a preferred embodiment, the FNCP 46 comprises a simple computer program which reads the incoming HTTP Post and creates a modified HTTP Post which can be processed by the FPP 24. The FNCP 46 evaluates each field name and its associated input value, and checks to see if the field name is one of the standardized field names identified in the mapping information. If it is one of the identified standardized field names, the FNCP replaces the standardized field name with the corresponding proprietary field name. The FPP 24 is then able to process the modified HTTP Post without problems because the modified HTTP Post contains the recognizable proprietary field names.

Thus, the FNCP 46 functions as an interface between the HTTP server 42 and the FPP 24 to translate the unrecognizable, standardized field names into the proprietary field names that the FPP 24 recognizes. Any changes to the standardized field names or development of new field names can be easily accommodated in the merchant's system by modifying only the computer form (in the HTML files) to use the new field names and the hidden mapping information to reflect the new field names.

FIG. 6 illustrates an example of an HTML file containing the embedded mapping information in accordance with the preferred embodiment of the present invention. In this example, the term "standard" refers to a standardized format such as ECML. As shown in FIG. 6, part P10 is a mapping instruction directing that the data following this instruction be sent to the FNCP 46. This instruction identifies the address of the FNCP 46 as "com.ibm.PaymentSuite.Convert.ConvertFields"; it is understood that any other name can be selected for this address as long as part P10 identifies the address or location of the FNCP 46.

Part P15 includes the embedded mapping information necessary to convert field names in accordance with the present invention. This information is hidden from the user, i.e., it is not displayed on the user's screen when he/she views the order form. The hidden mapping information includes a plurality of field pairs, each composed of a field name and a field value. The first two lines include a field named "__MAP__FORM__ACTION" and a field value "https://wassup.raleigh.ibm.com/cgi-bin/ncommerce3/NewOrder" which is the address of the FPP 24, where the modified HTTP Post will be eventually sent. The next field name, "__MAP__FORM__METHOD," specifies how data are to be sent to the HTTP server 42.

Figure 2:
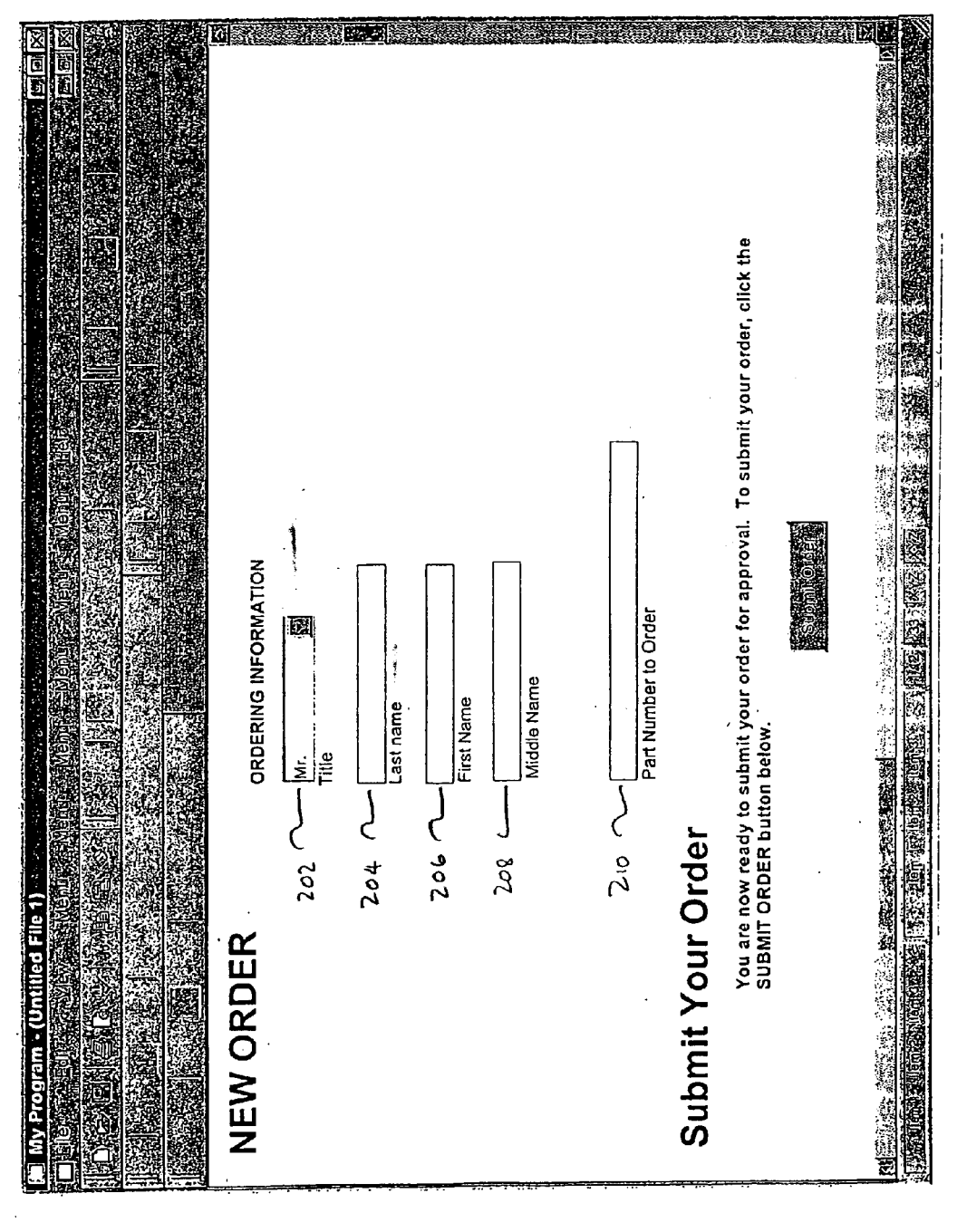

The next three field pairs provide linking information necessary for linking the standardized field names with the proprietary field names used by the merchant. For example, the field pair ("__MAP__Standard__Name__Last", "proprietary__lname") indicates that the standardized field name "Standard__Name__Last" is associated with the proprietary field name "proprietary__lname". Parts P30, P40 and P50 display an input area for the user's name information (e.g., where the field name is "Standard__Name__Last", the value of the field is the user's input last name). Parts P2, P6 and P7 are the same as those illustrated in FIG. 2.

FIG. 7 shows an example of an HTTP Post sent by the browser 12 based on the HTML file illustrated in FIG. 6. As shown in FIG. 7, the HTTP Post includes information 110 to direct the HTTP Post to the FNCP 46, and field pairs 120 containing the mapping information of part P15 in FIG. 6 as well as the user's input data.

Figure 8:
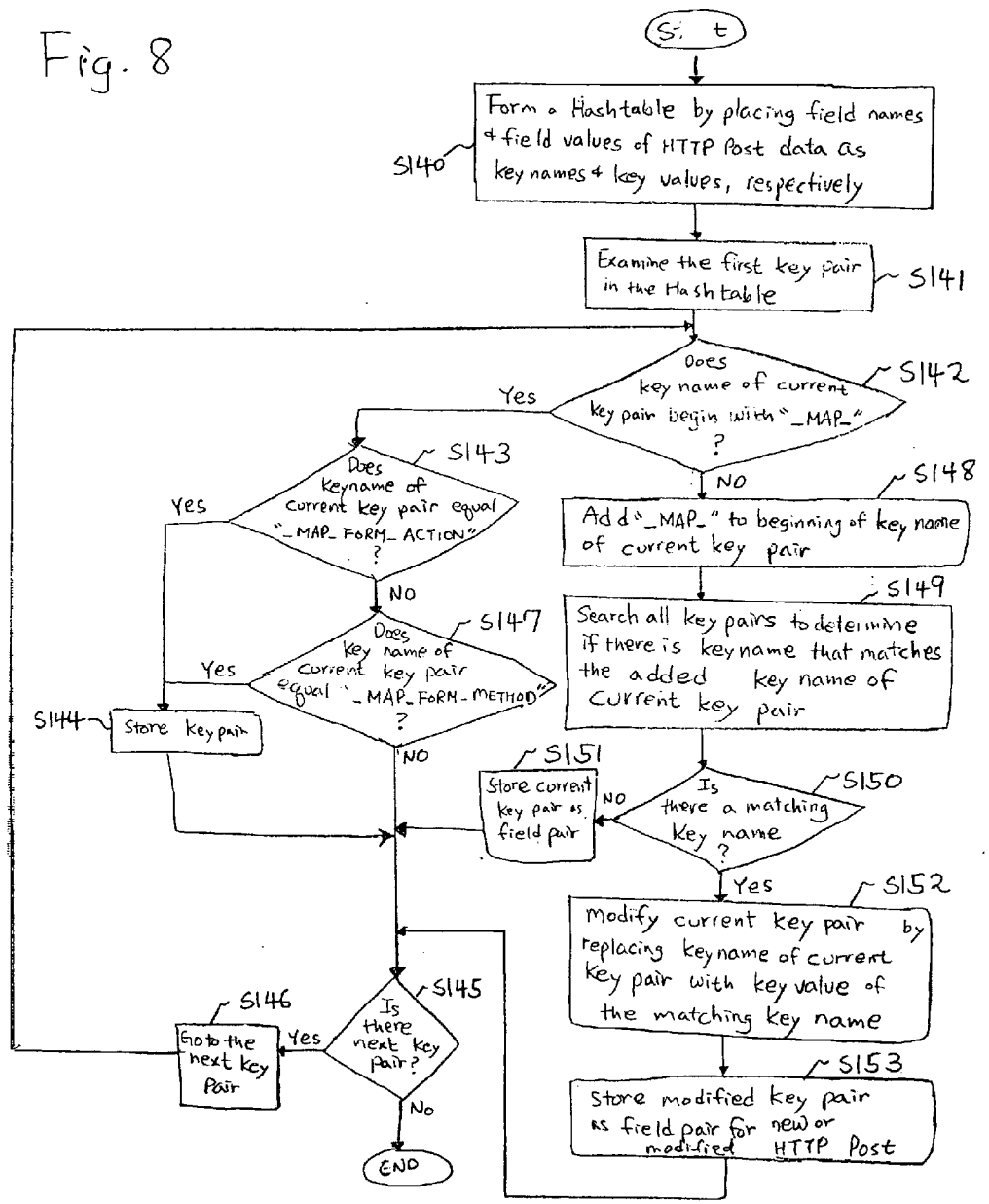
FIG. 8 is a flowchart for explaining a field converting process in accordance with the preferred embodiment of the present invention.

The field converting process of the FNCP 46 will now be described in detail referring to FIGS. 8–9C. FIG. 8 shows a flowchart for explaining the field converting process in accordance with the preferred embodiment of the present invention.

As shown in FIG. 8, in Step S140, a hashtable (see FIG. 9B) is prepared by the FNCP 46 upon receipt of the HTTP Post from the user's browser 12. The hashtable is composed of key pairs, each key pair having a key name and an associated key value, and is constructed by "copying" the field pairs of the HTTP Post (shown in FIG. 9A) into the hashtable as key pairs (shown in FIG. 9B). The key pairs function as a "working copy" of the field pairs of the HTTP Post, so that the field converting process can be safely implemented using the "working copy" without the danger of mismanaging the original HTTP Post data.

Then in Step S141, each key pair in the hashtable is examined by the FNCP 46. In Step S142, the FNCP 46 determines whether or not the key name of the current key pair (currently being examined) begins with a predetermined prefix. In this example, a prefix named "__MAP__"is utilized; however, any other name, symbol, phrase, number, etc. can be selected as the prefix. The prefix is utilized by the FNCP 46 to discriminate between the field pairs containing user's input data and the field pairs containing linking information.

If the key name of the current key pair begins with the prefix "__MAP__", then the FNCP 46 determines whether or not the key name equals "__MAP__FORM__ACTION" in Step S143. If the key name equals "__MAP__FORM__ACTION", then the current key pair is stored for later reference and use in Step S144. Otherwise, the FNCP 46 determines whether or not the key name equals "__MAP__FORM__METHOD" in Step S147. If the current key name equals "__MAP__FORM__METHOD", then the current key pair is stored for later reference and use in Step S144.

In Step S145, the FNCP 46 determines if there is a next key pair to be examined and, if there is, returns to Steps S142–S146 based on this determination. Otherwise, if the FNCP 46 determines that there are no more key pairs to be examined in the hashtable, the process is completed.

If, in Step S142, a determination is made that the key name of the current key pair does not begin with the prefix "__MAP__", then the FNCP 46 adds the prefix "__MAP__" to the beginning of the current key name to temporarily create a prefixed key name in Step S148. The prefixed key name is then employed by the FNCP 46 to locate those field pairs that contain the linking information since such field pairs contain prefixed field names. Then, in Step S149, the FNCP 46 searches all key pairs of the hashtable to determine if there is a key name that matches the prefixed key name of the current key pair. For example, if a prefixed key name of "__*MAP*__Standard__Name__Last" is created in Step S148, then the key name in key pair KP 3 (i.e., "__MAP__Standard__Name__Last") matches this prefixed key name (see FIG. 9B). If a match is found in Step S150, then the FNCP 46 modifies the current key pair by replacing the key name of the current key pair with the key value associated with the matching key name in Step S152. Then the modified key pair is stored as a field pair for the new HTTP Post in Step S153 and the process continues the examination of the next key pair until it reaches the end of the hashtable.

If, on other hand, Step 150 determines that there is no match in the hashtable, the current key pair is stored as a field pair without being modified in Step S151 and the process continues the examination of the next key pair until it reaches the end of the hashtable. Accordingly, the process examines each key pair in the hashtable and converts the key name of the current key pair if a key name matching the prefixed key name is found in the hashtable.

As an example, the field converting process of FIG. 8 performed on the HTTP Post shown in FIG. 9A will be explained below with respect to converting the standard field name, "Standard__Name__Last," into the proprietary field name, "Proprietary__lname__," by examining the key pair KP7 shown in FIG. 9B.

In examining the key pair KP7, Step S142 determines that the key name "Standard__Name__Last" of key pair KP7 does not begin with the prefix "__MAP__". Then Step S148 adds the prefix "__MAP__" to the key name such that the prefixed key name of "__MAP__Standard__Name__Last" is temporarily created. Step S149 searches the key names of all key pairs in the hashtable and Step S150 determines that the key name "__*MAP*__Standard__Name__Last" of key pair KP3 matches the prefixed key name of the current key pair KP7. Then in Step S152, the FNCP 46 replaces the key name "Standard_Name_Last" of the key pair KP7 with the key value "Proprietary_lname" of the located key pair KP3. As a result, the modified key pair KP7 is formed with the key name "Proprietary_lname" and the key value "Sibert"; in other words, the name "Standard_Name_Last" is converted into the name "Proprietary_lname". In Step S153, the modified key pair KP7 (Proprietary_lname, Sibert) is stored as a field pair to be included in the modified HTTP Post which is to be processed by the FPP 24.

FIG. 9C shows an example of field pairs output as a result of the field convening process of FIG. 8. As shown in FIG. 9C, the field names use proprietary names (e.g., Proprietary_lname, Proprietary_fname, Proprietary_mname, etc.) instead of the standardized field names. The field pairs of FIG. 9C are included in the new or modified HTTP Post sent tot the FPP 24. As a result, the FPP 24 is able to process the user's data stored under the proprietary field names.

Accordingly, the present invention is applicable wherever a field name conversion is desired, especially in a computer form based environment. The present invention converts a first set of field names of a computer form into a second set of field names in a systematic and efficient manner so that the existing systems, which recognize only the second set of field names, do not need to be restructured and extensively modified to recognize the first set of field names. The present is also applicable when data from one merchant's system are to be received by another merchant's system for processing.

Another applicable area of the present invention is with ECML and digital wallet concept. Since ECML, designed to enhance the online shopping experience, uses standardized field names for receiving user's data, e.g., personal and financial information, the merchants can use the present invention such that their existing system (which uses proprietary field names) can process the user's data received under the standardized field names without having to make extensive modifications to their existing system.

Although the present invention has been described with respect to a specific preferred embodiment thereof, various changes and modifications may be suggested to one skilled in the art. For example, the FNCP is merely one example of implementation of the technique of the present invention and the technique may be implemented in different manners. It is intended that the present invention encompass such changes and modifications as fall within the scope of the appended claims.

I claim:

1. A method of translating the data structure of a data group pertaining to a computer form from a first format to a second format, comprising the steps of:
   correlating field identifiers of the first format with field identifiers of the second format, and storing the results of said correlation in a mapping memory;
   identifying data values in the data group correlated to the field identifiers of the first format, and storing said identified data values in a data memory; and
   replacing field identifiers of the identified data values with field identifiers of the second format based on the results of the correlating step;
   wherein the identifying step includes the steps of:
      adding a temporary prefix to each field identifier of the first format stored in the data memory; and
      comparing each temporarily prefixed field identifier with field identifiers stored in the mapping memory to thereby identify data values correlated to the field identifiers of the first format.

2. The method of claim 1, further comprising the step of:
   receiving, through a communication network, the contents of the data and mapping memories.

3. The method of claim 2, wherein, in the receiving step, the communication network includes the Internet and the computer form includes a web page.

4. The method of claim 1, further comprising the steps of:
   embedding the results of the correlating step on the computer form; and
   transmitting the embedded computer form to a user to fill out through a communication network.

5. The method of claim 1, wherein the first format is ECML (Electronic Commerce Modeling Language) format.

6. Computer readable code stored on media, for translating the data structure of a data group pertaining to a computer form from a first format to a second format, comprising:
   first subprocesses for correlating field identifiers of the first format with field identifiers of the second format, and storing the results of said correlation in a mapping memory;
   second subprocesses for identifying data values in the data group correlated to the field identifiers of the first format, and storing said identified data values in a data memory; and
   third subprocesses for replacing field identifiers of the identified data values with field identifiers of the second format based on the results of the correlation to convert the first data field into the third data field;
   wherein the second subprocess for identifying includes subprocesses of:
      subprocesses for adding a temporary prefix to each field identifier of the first format stored in the data memory; and
      subprocesses for comparing each temporarily prefixed field identifier with field identifiers stored in the mapping memory to thereby identify data values correlated to the field identifiers of the first format.

7. The code of claim 6, further comprising:
   fourth subprocesses for receiving, through a communication network, the data group and mapping information, the mapping information corresponding to the results of the correlating step.

8. The code of claim 7, wherein the communication network includes the Internet and the computer form includes a web page.

9. The code of claim 6, wherein the results of the correlation performed by the first subprocesses are represented as mapping fields, and the second subprocesses add a prefix to each field identifier of the data fields of the data group and compare the prefixed field identifier with field identifiers of the mapping fields to identify the data fields of the data group corresponding to the first format.

10. The code of claim 6, wherein the first processes embed the results of the correlation on the computer form, and transmit the embedded computer form to a user to fill out through a communication network.

11. The code of claim 6, wherein the first format is ECML (Electronic Commerce Modeling Language) format.

12. A system for processing form data of a computer form, the system comprising:
   first means for receiving form data of the computer form through a communication network, the form data including mapping information and a plurality of first data field pairs, each of the first data field pairs including a first field name and a first field value;

second means for communicating with the first means, changing at least one of the first field names based on the mapping information, and thereby generating a plurality of second data field pairs; and third means for communicating with the first means and processing the plurality of second field pairs;

wherein the mapping information includes a plurality of third data field pairs, each of the third data field pairs including a third field name and a third field value, and the second means prepares a hashtable based on the mapping information and the plurality of first data field pairs, the hashtable containing a plurality of key pairs, each of the key pairs including a key name and a key value, adds a prefix to at least one of the key names of the key pairs, determines if the prefixed key name matches any other key names in the hashtable, and replaces at least one of the first field names with the key value associated with the matching key name based on results of the determination to generate at least one of the plurality of second field pairs.

13. The system of claim 12, wherein the communication network includes the Internet and the computer form includes a HyperText Markup Language (HTML) form.

14. The system of claim 13, wherein the second means embeds the mapping information on the computer form and transmits the computer form having the embedded mapping information to a user's computer through the communication network, whereby the user's computer transmits the form data and the mapping information to the first means.

15. The system of claim 12, wherein the first field names include ECML (Electronic Commerce Modeling Language) field names.

16. A method of processing form data of a computer form, the method comprising the steps of:

receiving the form data of the computer form through a communication network, the form data including mapping information and a plurality of first data field pairs, each of the first data field pairs including a first field name and a first field value;

changing at least one of the first field names based on the mapping information and thereby generating a plurality of second data field pairs; and processing the plurality of second data field pairs;

wherein, in the receiving step, the mapping information includes a plurality of third data field pairs, each of the third data field pairs including a third field name and a third field value, and the changing step includes the steps of:

preparing a hashtable based on the mapping information and the plurality of first data field pairs, the hashtable containing a plurality of key pairs, each of the key pairs including a key name and a key value, adding a prefix to at least one of the key names of the key pairs, determining if the prefixed key name matches any other key name in the hashtable, and replacing at least one of the first field names with the key value associated with the matching key name based on results of the determining step to generate at least one of the plurality of second data field pairs.

17. The method of claim 16, further comprising the steps of:

prior to the receiving step, embedding the mapping information on the computer form; and transmitting the computer form having the embedded mapping information to a user's computer through the communication network, so that the form data can be received in the receiving step.

18. The method of claim 17, wherein, in the transmitting step, the communication network includes the Internet and the computer form includes a HyperText Markup Language (HTML) form.

19. The method of claim 16, wherein, in the changing step, at least one of the first field names includes an ECML (Electronic Commerce Modeling Language) field name.

* * * * *